(12) United States Patent
Zwijze et al.

(10) Patent No.: US 9,297,687 B2
(45) Date of Patent: Mar. 29, 2016

(54) SENSE ELEMENT HAVING A STUD FITTED WITHIN THE SENSE ELEMENT

(71) Applicants: Robert Zwijze, Vriezenveen (NL); David Hatch, Monson, MA (US)

(72) Inventors: Robert Zwijze, Vriezenveen (NL); David Hatch, Monson, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 264 days.

(21) Appl. No.: 13/896,980

(22) Filed: May 17, 2013

(65) Prior Publication Data

US 2014/0338988 A1 Nov. 20, 2014

(51) Int. Cl.
| | |
|---|---|
| *B60R 21/015* | (2006.01) |
| *G01G 3/14* | (2006.01) |
| *G01G 19/12* | (2006.01) |
| *G01G 19/414* | (2006.01) |
| *G01L 1/22* | (2006.01) |
| *B60N 2/00* | (2006.01) |
| *G01G 3/13* | (2006.01) |

(52) U.S. Cl.
CPC .......... *G01G 3/1408* (2013.01); *G01G 19/4142* (2013.01); *G01L 1/2293* (2013.01); *B60N 2/002* (2013.01); *B60R 21/01516* (2014.10); *G01G 3/13* (2013.01); *G01G 3/1414* (2013.01)

(58) Field of Classification Search
CPC ... G01L 1/2231; G01L 1/2237; G01L 1/2293; G01G 3/1402; G01G 3/1404; G01G 3/1408; G01G 3/13; G01G 3/141; G01G 19/12; G01G 19/4142; B60R 21/01516; B60N 2/002
See application file for complete search history.

(56) References Cited

U.S. PATENT DOCUMENTS

| | | | | | |
|---|---|---|---|---|---|
| 3,461,715 | A | * | 8/1969 | Stover | 73/862.635 |
| 3,554,025 | A | * | 1/1971 | Anderson et al. | 73/862.632 |
| 3,695,096 | A | * | 10/1972 | Kutsay | 73/761 |
| 3,775,839 | A | * | 12/1973 | Talmo et al. | 29/595 |
| 4,212,360 | A | * | 7/1980 | Chesher | 177/139 |
| 4,421,186 | A | * | 12/1983 | Bradley | 177/139 |
| 4,576,052 | A | * | 3/1986 | Sugiyama | 73/862.68 |
| 5,154,247 | A | * | 10/1992 | Nishimura et al. | 177/211 |
| 5,222,399 | A | * | 6/1993 | Kropp | 73/862.68 |
| 5,313,022 | A | * | 5/1994 | Piroozmandi et al. | 177/211 |
| 5,837,946 | A | * | 11/1998 | Johnson et al. | 177/139 |

(Continued)

FOREIGN PATENT DOCUMENTS

| | | | |
|---|---|---|---|
| DE | 10151561 A1 | * 7/2002 | |
| WO | WO 2006005273 A1 | * 1/2006 | ............ G01L 1/2231 |

(Continued)

OTHER PUBLICATIONS

Machine translation of WO 2006/005373 from EPO website. Jul. 12, 2015.*

*Primary Examiner* — Randy W Gibson
(74) *Attorney, Agent, or Firm* — Chapin IP Law

(57) ABSTRACT

In an embodiment, an apparatus may include a sense element having a first end and a second end; and a stud fitted inside the sense element. The stud may have a first end and a second end. The first end of the stud may be free floating with respect to the sense element. The second end of the stud may be attached to the second end of the sense element. The sense element may include one or more gauges. The gauges may sense strain on the sense element. The apparatus may include a ridge that may be used to provide overload protection of the apparatus. The ridge may be placed on the stud, the sense element, or the stud and sense element.

17 Claims, 7 Drawing Sheets

(56) References Cited

U.S. PATENT DOCUMENTS

| | | | | |
|---|---|---|---|---|
| 5,905,210 A * | 5/1999 | O'Boyle et al. | | 73/862.331 |
| 6,250,863 B1 * | 6/2001 | Kamentser et al. | | 411/10 |
| 6,412,357 B2 * | 7/2002 | Billen | | B60N 2/002 177/136 |
| 6,441,324 B1 * | 8/2002 | Stimpson | | 177/137 |
| 6,501,211 B1 * | 12/2002 | Nasrollahzadeh | | 310/338 |
| 6,768,065 B2 * | 7/2004 | Bertenburg et al. | | 177/144 |
| 6,797,892 B2 * | 9/2004 | Golla | | B60N 2/002 177/144 |
| 6,865,961 B2 * | 3/2005 | Wolf | | G01G 3/15 177/136 |
| 6,952,972 B2 * | 10/2005 | Schulze | | G01G 23/005 73/862.041 |
| 6,986,293 B2 * | 1/2006 | Dukart | | B60N 2/002 73/862.391 |
| 7,069,796 B2 * | 7/2006 | Dukart | | G01G 7/02 73/862.69 |
| 7,073,391 B2 * | 7/2006 | Dukart | | B60N 2/002 73/779 |
| 7,189,931 B2 * | 3/2007 | Hida et al. | | 177/144 |
| 7,373,846 B2 * | 5/2008 | Furukawa et al. | | 73/862.621 |
| RE43,989 E * | 2/2013 | Furukawa et al. | | 73/862.621 |
| 2004/0007397 A1 * | 1/2004 | Golla | | B60N 2/002 177/243 |
| 2004/0060369 A1 * | 4/2004 | Liu et al. | | 73/862.041 |
| 2004/0255687 A1 * | 12/2004 | Dukart | | 73/779 |
| 2005/0061643 A1 * | 3/2005 | Rainey | | 200/85 A |
| 2005/0284238 A1 * | 12/2005 | Wilkie et al. | | 73/862.045 |
| 2006/0053898 A1 * | 3/2006 | Selig | | B60R 21/01516 73/818 |
| 2007/0273367 A1 * | 11/2007 | Munz et al. | | 324/207.24 |
| 2011/0168457 A1 * | 7/2011 | Masahiko | | G01L 1/2231 177/211 |
| 2015/0160080 A1 * | 6/2015 | Fujisawa | | G01L 1/26 73/862.627 |

FOREIGN PATENT DOCUMENTS

| | | | | |
|---|---|---|---|---|
| WO | WO 2006038553 A1 * | 4/2006 | | G01L 1/2231 |
| WO | WO 2010041395 A1 * | 4/2010 | | G01L 1/2231 |

\* cited by examiner

SENSE ELEMENT HAVING A STUD FITTED WITHIN THE SENSE ELEMENT

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

An occupant weight sensor (OWS) may be used to sense one or more forces applied to a seat in a vehicle (e.g., automobile, truck). The sensed forces may be used to control deployment of, for example, an airbag. For example, an OWS may be used to sense forces that may be associated with applying weight to a seat in a vehicle. The OWS may provide a signal to an air bag deployment system that may use the signal to determine whether an air bag associated with the seat should be deployed in the event of an accident involving the vehicle.

Figure 1:
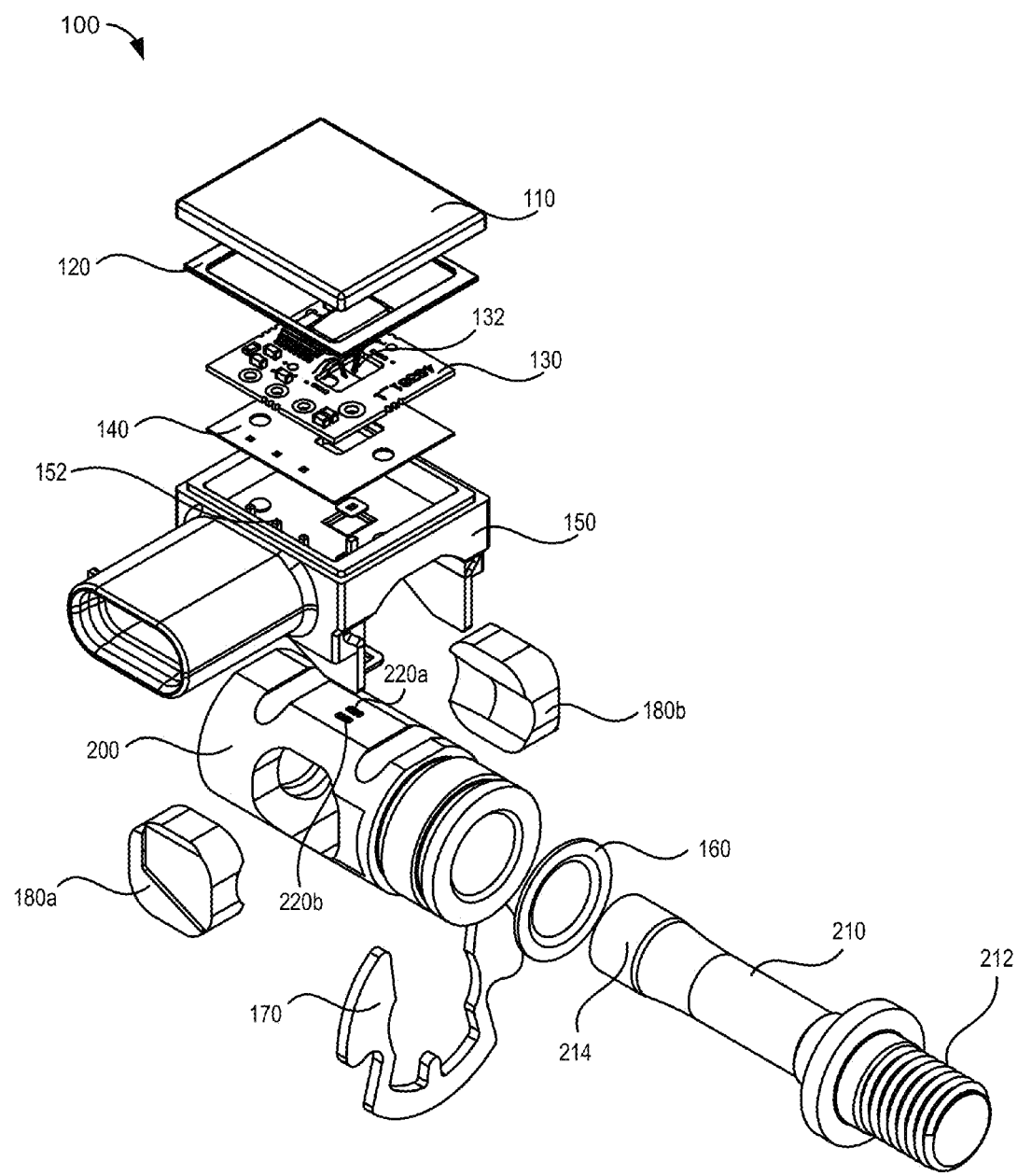
FIG. 1 illustrates an example of an occupant weight sensor (OWS)

FIG. 1 illustrates an example of an OWS 100 that may be used to sense one or more forces applied to a seat in a vehicle. Referring to FIG. 1, OWS 100 may include a variety of components, such as, for example, a cover 111, an environmental seal 120, an electronic module assembly (EMA) 130, an EMA adhesive 140, a connector assembly 150, a dust barrier 160, a retaining clip 170, dust caps 180a-b, a sense element 200, a stud 210, and gauges 220a-b.

It should be noted that FIG. 1 illustrates an example embodiment of an OWS 100 that may employ features described herein. Other embodiments of OWSs that may employ features described herein may include more components or fewer components than illustrated in FIG. 1. Moreover, functions performed by components in the other embodiments may be distributed among the components differently than described herein.

Cover 110 and seal 120 may provide protection for EMA 130. Specifically, EMA 130 may rest inside a cavity of connector assembly 150. Seal 120 may be placed between connector assembly 150 and cover 110. Cover 110 may rest on top of seal 120 and the combination of cover 110 and seal 120 may be fitted on top of the connector assembly 150 to enclose the EMA 130. Seal 120 may be used to provide a weather seal that may be used to prevent, for example, moisture from entering the cavity containing the EMA 130.

EMA 130 may include circuitry that may be used to, for example, sense one or more signals (e.g., voltages) that may be generated by gauges 220a-b. EMA 130 may include one or more electrically conductive wires 132 that may be used to transmit the signals from the gauges 220a-b to the EMA 130. EMA adhesive 140 may include an adhesive that may be used to affix (e.g., bond) EMA 130 to connector assembly 150.

Connector assembly 150 may be secured (e.g., fastened, attached) to the sense element 200. Connector assembly 150 may include one or more pins 152. Pins 152 may provide, for example, an electrical contact between a connector (not shown) that may be connected to OWS 100 and the EMA 130.

Retaining clip 170 may be used to secure the sense element 200 to, for example, an upper portion of a seat structure in a vehicle. Details of an example seat structure will be described further below.

Dust barrier 160 may include an O-ring that may be used to prevent dust and/or other debris (e.g., ice) from entering the sense element 200 where the stud 210 fits into the sense element 200. Similarly, dust caps 180a-b may be used to prevent dust and/or other debris from entering the sense element 200 from openings in the sides of the sense element 200.

Stud 210 may include a first end 212 and a second end 214. The first end 212 may be threaded to accept a nut (not shown) that may be used to secure the stud 210 to a lower portion of a seat structure. The second end 214 may be secured to the sense element 200 using, for example, a spot weld. It should be noted, however, other techniques for securing the stud 210 to the sense element 200 may be used. For example, a thread may be present at the second end 214 to enable the second end 214 end to be secured to the sense element 200 using a nut.

Gauges 220a-b may be strain gauges. One or more of the gauges 220a-b may be, for example, mono crystalline silicon gauges (MSGs) that may be fabricated using a semiconductor process. Utilizing MSG-type gauges for gauges 220a-b may enhance a safety factor and overstress capability of the OWS 100. Moreover, utilizing MSG-type gauges for gauges 220a-b may improve a signal-to-noise ratio of the gauges 220a-b.

The gauges 220a-b may include a piezoresistive layer that may be formed using an epitaxy process. Geometry of the gauges 220a-b may be defined, for example, by a deep reactive-ion etching (DRIE) process. The gauges 220a-b may include aluminum metallization and may be attached to the sense element 200 using, for example, a glass bonding process.

Gauges 220a-b may provide a particular gauge factor. For example, gauges 220a-b may provide a gauge factor of 150.

A gauge 220 may include one or more resistive elements. The resistive elements may be connected (e.g., wired) to one or more other resistive elements (e.g., in one or more other gauges 220) to form a bridge circuit, such as a Wheatstone bridge circuit. The bridge circuit may be, for example, a quarter bridge circuit, half-bridge circuit, or full-bridge circuit.

For example, gauges 220a and 220b may each provide two resistive elements for a total of four resistive elements. The four resistive elements may be wired (e.g., through the EMA 130) to form a full-bridge circuit. An example bridge circuit that may be used will be described further below.

Figure 2:
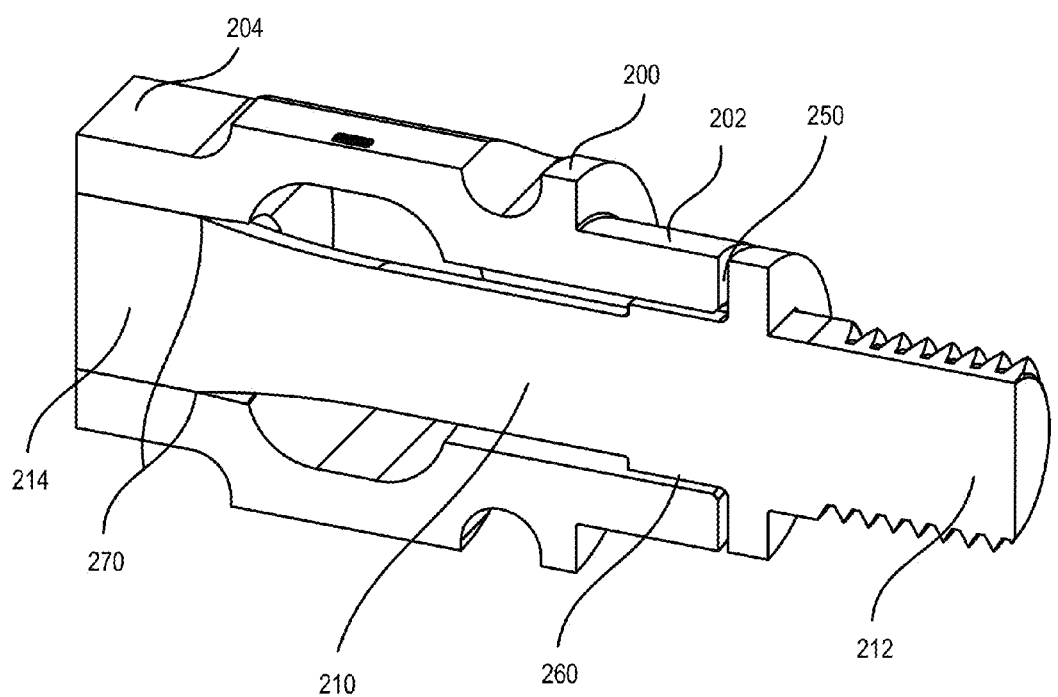
FIG. 2 illustrates a cutaway view of an example of a stud and sense element that may be included in an OWS.

FIG. 2 illustrates an example cutaway view of stud 210 fitted within the sense element 200. Referring to FIG. 2, stud 210 may fit within the sense element 200 where (1) the second end 214 of stud 210 the may fit securely against a second end 204 of the sense element 200 and (2) the first end 212 of stud 210 may free float at the first end 202 of the sense element 200.

Note that the first end 212 of stud 210 may protrude from the sense element 200 at the first end 202 of the sense element 200. Also note that the first end 212 of stud 210 free floating at the first end of 202 of the sense element 200 may include the first end 212 of stud 210 not touching the first end of 202 of the sense element 200 when, for example, (1) no force is applied to the OWS 100 or (2) a force associated with a normal workload is applied the OWS 100. A normal workload may include a workload that does not involve one or more forces that may overload the OWS 100. Under a normal workload the first end 212 of stud 210 may, for example, continue to be free floating and may not make contact (touch) the sense element 200.

The second end 214 of stud 210 may be fitted securely against the second end 204 of the sense element 200 by shaping the second end 214 of the stud 210 and the second end 204 of sense element 200 such that the second end 214 of the stud 210 and the second end 204 of sense element 200 touch. Moreover, the second end 214 of the stud 210 may be fastened to the second end 204 of the sense element 200, for example, such as described above, to further secure the second end 214 of the stud 210 with the second end 204 of the sense element 200.

A gap 250 between the first end 202 of the sense element 200 and the first end 212 of the stud 210 may be provided to enable the first end 212 of stud 210 to free float at the first end 202 of the sense element 200. The gap 250 may extend along the outside of the stud 210 to a point 270 where the second end 214 of the stud 210 is fitted to the second end 204 of the sense element 200. Note that the sense element 200 and/or stud 210 may be shaped (e.g., tapered) to form gap 250.

A ridge 260 may be included to, for example, provide overload protection for the OWS 100 when the OWS 100 is subjected to one or more forces that may be associated with an abnormal workload. In the example stud 210 and sense element 200 illustrated in FIG. 2, the ridge 260 is included on stud 210. Note, however, the ridge 260 may be included elsewhere. For example, the ridge 260 may be included on the sense element 200 or on the sense element 200 and the stud 210.

Figure 3:
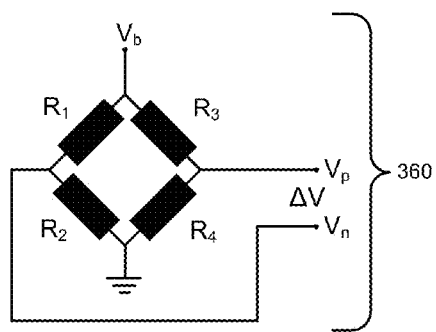
FIG. 3 illustrates an example operation of a sense element and stud that may be included in an OWS.
Figure 3:
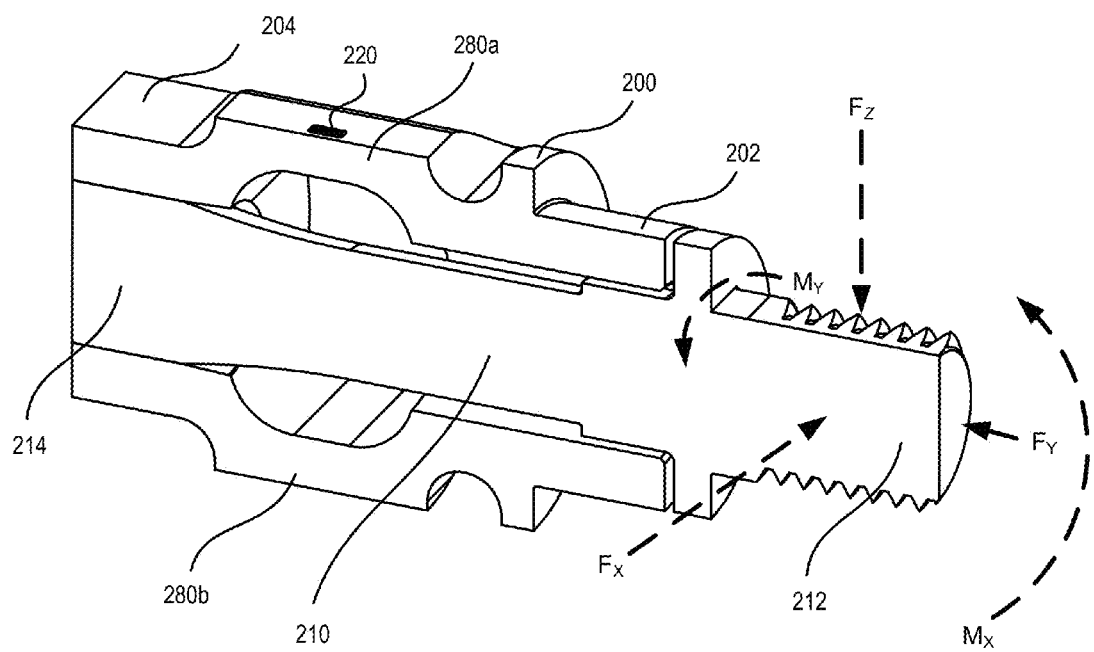

FIG. 3 illustrates an example operation of the sense element 200 and the stud 210. Note that the sense element 200 and stud 210 are shown in a cutaway view of the sense element 200 and stud 210.

Referring now to FIG. 3, sense element 200 may include a first beam 280a and a second beam 280b. Gauges 220 may be placed on, for example, the first beam 280a of the sense element. The gauges 220 may be arranged to form a bridge circuit 360. The bridge circuit 360 may include, for example, four resistive elements (i.e., $R_1$, $R_2$, $R_3$, and $R_4$) that may be wired to form a Wheatstone bridge circuit. The bridge circuit 360 may be a full-bridge circuit such that, for example, each resistive element in the bridge circuit may be a variable.

A fixed voltage $V_b$ may be applied to the bridge circuit 360. When the bridge circuit is in balance (e.g., no strain is applied to the gauges 220) a predetermined voltage (e.g., zero volts) may be present across terminals $V_p$ and $V_n$. An unbalanced condition to the bridge circuit 360 (e.g., strain applied to one or more of the gauges 220) may cause the voltage present across points $V_p$ and $V_n$ to be different than when the bridge circuit 360 is balanced.

Forces, such as forces $F_Z$ and/or $F_X$, may be applied, for example, to the first end 212 of the stud 210. The forces may be transmitted from the first end 212 to the beams 280a-b via the second end 214 of the stud 210, and the second end 204 of the sense element 200. The forces transmitted to beams 280a-b may be sensed by gauges 220. The forces may cause a change of resistance in one or more resistive elements in the bridge circuit 360 formed by the gauges 220. The change in resistance may imbalance the bridge circuit 360. The imbalance may cause the voltage across points $V_p$ and $V_n$ of the bridge circuit 360 to change.

The change in voltage may be sensed by a circuit (e.g., an application specific integrated circuit (ASIC)) contained on EMA 130 (FIG. 1). In response to sensing the change in voltage, the circuit on EMA 130 may generate a signal. The generated signal may be transmitted from the OWS 100 to, for example, an air bag deployment system that may use the signal to determine whether an air bag should be deployed.

Note that FIG. 3 illustrates examples of moments (e.g., $M_X$, $M_Y$) that may occur during an operation of stud 212 and/or sense element 200.

Figure 4:
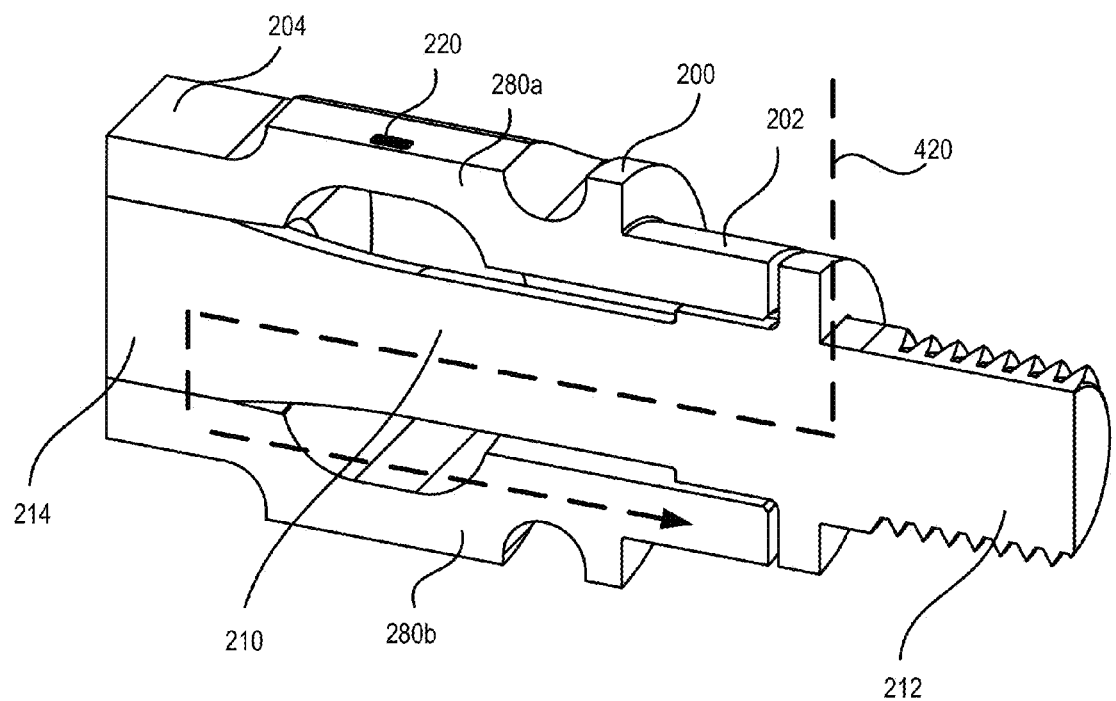
FIG. 4 illustrates an example path that may be taken by a force applied to an OWS under a normal workload.

FIG. 4 illustrates an example path 420 of a force that may be applied to example stud 210 and sense element 200 under a normal workload. Note that the sense element 200 and stud 210 are shown in FIG. 4 in a cutaway view of the sense element 200 and stud 210.

Referring now to FIG. 4, the force may be applied to the first end 212 of stud 210. The force may be transmitted on path 420 from the first end of 212 of stud 210 through stud 210 to the second end 214 of stud 210. The force may continue to be transmitted along the path 420 down through the second end 214 of stud 210 to the second end 204 of sense element 200 via beams 280a-b. From the second end 204 of sense element 200, the force may continue on path 420 to the first end 202 of sense element 200. The force taking path 420 may cause a strain on beam 280a. The strain on beam 280a may be sensed by one or more of the gauges 220.

Figure 5:
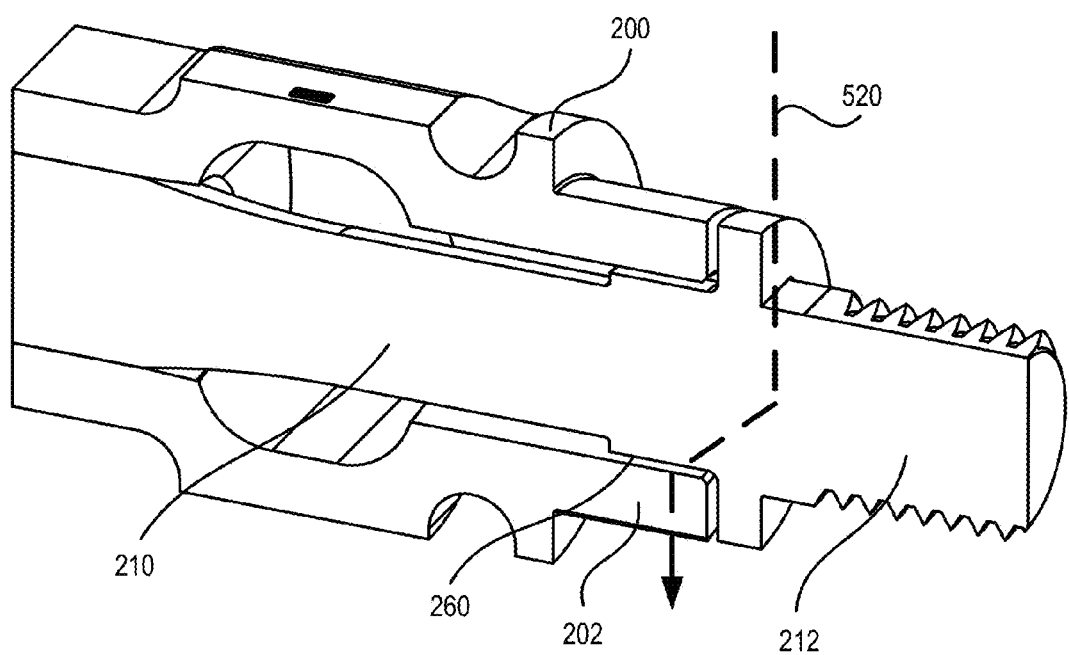
FIG. 5 illustrates an example path that may be taken by a force applied to an OWS that may trigger overload protection.

FIG. 5 illustrates an example path 520 of a force that may be applied to example stud 210 and sense element 200 under an abnormal workload that may trigger overload protection. Note that the sense element 200 and stud 210 are shown in FIG. 5 in a cutaway view of the sense element 200 and stud 210.

Referring now to FIG. 5, the force may be applied to the first end 212 of stud 210. The force may be transmitted on path 520 from the first end of 212 of stud 210 through stud 210 to the first end 202 of sense element 200. The force taking path 520 may cause ridge 260 to make contact with the first end 202 of sense element 200. In an embodiment, ridge 260 may make contact with the first end 202 of sense element 200 when a force of 1.5 kilonewtons (kN) is applied and may be able to handle forces up to 50 kN. Note that the force taking path 520 may prevent beams 280a-b from being overloaded.

Figure 6:
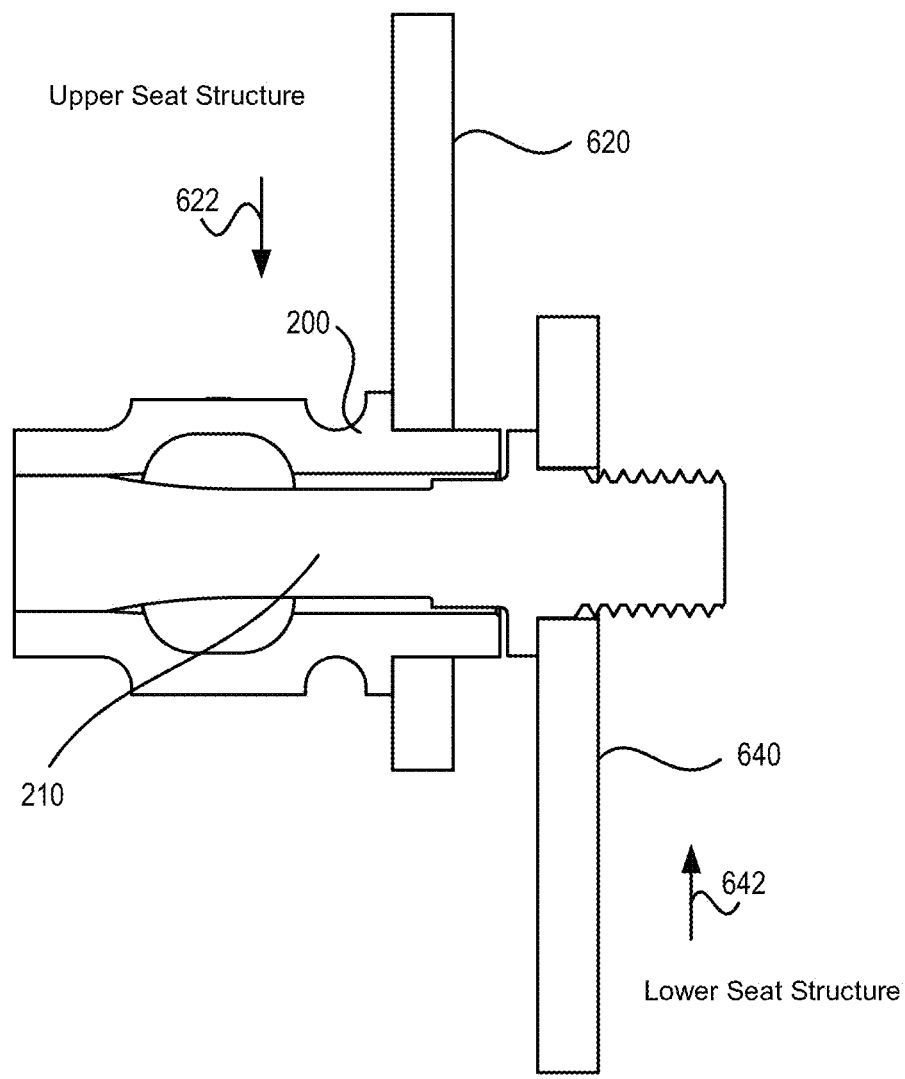
FIG. 6 illustrates an example mounting of a stud and sense element that may be included in an OWS.

FIG. 6 illustrates an example mounting sense element 200 and stud 210 on a seat structure. Note that the sense element 200 and stud 210 are shown in FIG. 6 in a cutaway view of the sense element 200 and stud 210. Referring to FIG. 6, the seat structure may include an upper portion 620 and a lower portion 640. The seat structure may be used in a vehicle where a seat in the vehicle may be included in the upper portion 620 and a rail that the seat may ride on may be included in the lower portion 640.

The sense element 200 and stud 210 may be mounted horizontally with respect to the seat structure. The first end 212 of the stud 210 may be mounted through a hole in a lower portion 640 of a seat structure. The first end 212 of the stud 210 may be secured to the lower portion 640 of the seat structure using, for example, a fastener (not shown), such as, for example, a nut.

The upper portion 620 of the seat structure may include, for example, a height adjuster link that may be used to adjust a height of the seat. The first end 202 of sense element 200 may be secured to the upper portion 620 of the seat structure using, for example, a fastener (not shown), such as, for example, a retaining clip. An example of a retaining clip that may be used may include retaining clip 170 (FIG. 1).

Arrows 622 and 642 illustrate directions of forces that may be applied to the sense element 200 and stud 210, respectively, when the sense element 200 and stud 210 are mounted in the seat structure as illustrated in FIG. 6. Specifically, arrow 622 indicates that a downward direction force may be applied to the sense element 200 when the sense element 200 is mounted in the seat structure as illustrated in FIG. 6. Moreover, arrow 642 indicates that an upward direction force may be applied to the stud 210 when the stud 210 is mounted in the seat structure as illustrated in FIG. 6.

Figure 7:
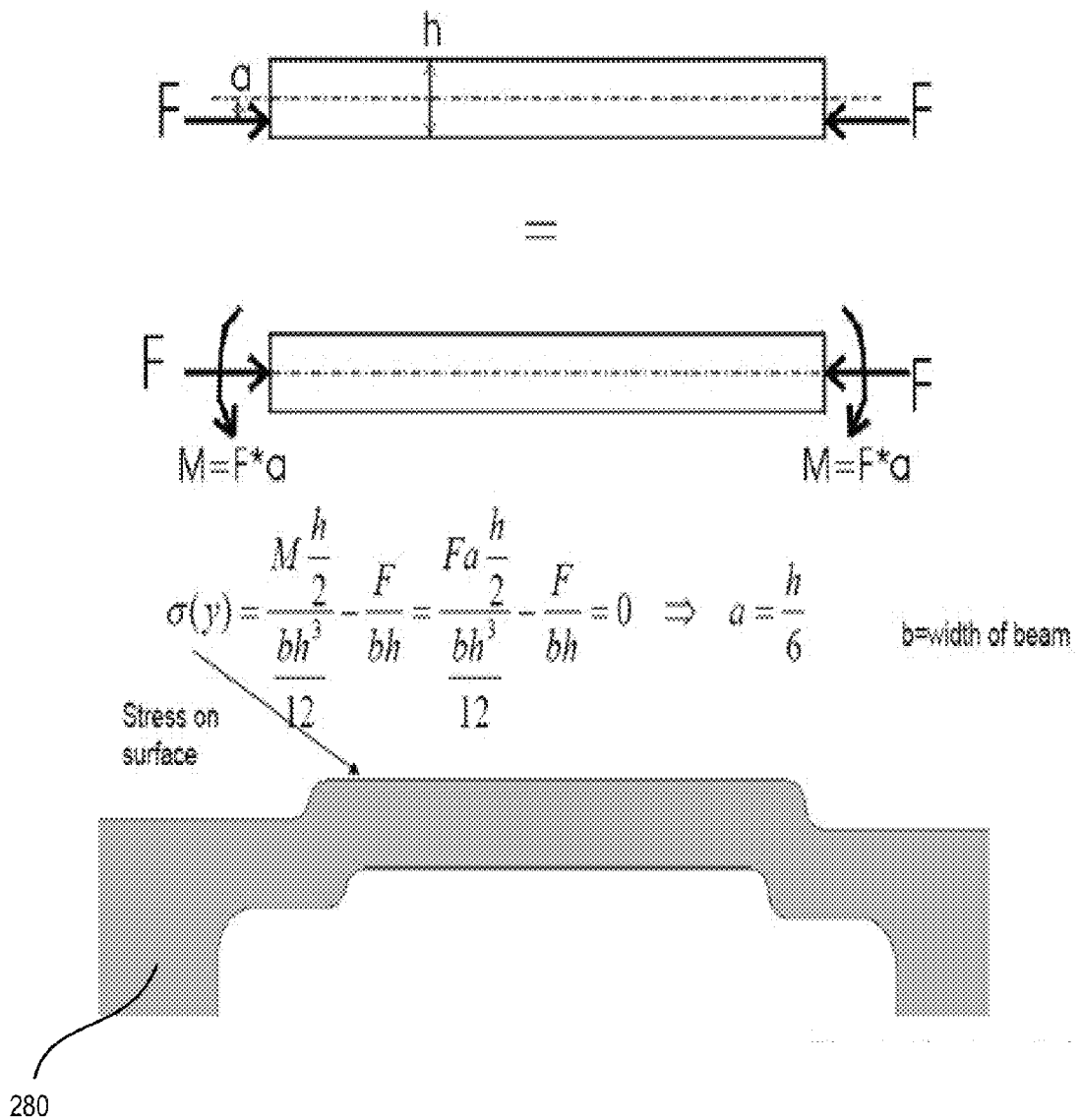
FIG. 7 illustrates an example of a beam that may be used in an OWS.

FIG. 7 illustrates an example of a beam 280. Various parasitic forces and moments may be present when sense element 200 and stud 210 are mounted, for example, on a seat structure. Various techniques may be used to reduce these parasitic forces and moments.

For example, referring to FIG. 7, supporting the beam 280 on both ends below its neutral line, may relieve stress and strain on the beam 280 at a point where the gauges 220 may be placed on the beam 280 (e.g., at the top of the beam 280). This may reduce parasitic "X" moments ($M_X$) on the gauges 220.

Parasitic "Y" moments (My) may be reduced based on, for example, a relationship between the upper seat structure 620 and the stud 212. For example, the upper seat structure 620 may include a height adjuster link that may be used to adjust a height of a seat that may be associated with the upper seat structure 620. The adjuster link may couple the upper seat structure 620 to the stud 212 and may freely rotate around the y-axis of the stud 212, thereby reducing effects of My moments on the gauges 220. In addition, gauges 220a and 220b may be symmetrically located around, for example, a vertical central plane of sense element 200 such that $M_Y$ moments may cause a positive change in resistance in two resistive elements of bridge circuit 360 and a same negative change in resistance of two other resistive elements of bridge circuit 360. These changes in resistance may result in, for example, a net result of zero change in output ΔV of the bridge circuit 360.

Parasitic $M_Z$ moments and $F_X$ forces may be reduced, for example, by laying the gauges on a neutral line of bending of the beam 280. FIG. 7 illustrates an example of a parasitic $F_X$ force. Part of an error (e.g., a linear part) that may be introduced due to a parasitic force $F_X$ may be caused, for example, when beams 280a-b are not aligned perpendicular to the force Fx which may result in a component parasitic force Fz. This cause may be obviated by providing a perpendicular alignment of the sense element 200 with respect to the parasitic force Fz.

Another cause of error may be due to placement tolerances of one or more gauges 220 on a beam 280. This cause may be obviated by tuning an angular position of the stud 210 with respect to the sense element 200 such that the parasitic Fx forces are reduced. The tuning may occur, for example, during calibration of an OWS that includes the stud 210 and sense element 200. For example, the tuning may occur after the OWS is mounted in a seat assembly.

Stiffness in beams 280a-b in a y-direction may reduce parasitic $F_Y$ forces and strain in a beam 280 that may contain gauges 220 (e.g., beam 280a). A parasitic $F_Y$ force may be reduced based on, for example, placement of one or more OWS's in a system.

For example, suppose a seat assembly includes a seat, an upper seat structure, and a lower seat structure. Further, suppose the seat assembly incorporates four OWS's 100 that are mounted between the upper seat structure and the lower seat structure and where a first OWS 100 is mounted at a right-front (RF) position of the seat assembly, a second OWS 100 is mounted at a left-rear (LR) position of the seat assembly, a third OWS 100 is mounted at a right-front (RF) position of the seat assembly, and a fourth OWS 100 is mounted at a right-rear (RR) position of the seat assembly. A parasitic $F_Y$ force may be reduced in this example by mounting the OWS's 100 at the RF and LR positions with the gauges 220 facing upwards and the OWS's 100 at the LF and RR positions with the gauges 220 facing downwards. Doing so may cause a total parasitic $F_Y$ force seen by LF and LR OWS's 100 to be the same as a total parasitic $F_Y$ force seen by RF and RR sensors. Thus, most if not all parasitic $F_Y$ forces associated with the seat assembly may be canceled because OWS's 100 with gauges 220 facing upward may have a same but opposite parasitic for $F_Y$ force as OWS's 100 with gauges 220 facing downward.

The foregoing description of embodiments is intended to provide illustration and description, but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. An apparatus comprising:
   a sense element having a first end, a second end, a first beam, and a second beam, the first beam and the second beam being between the first end and the second end of the sense element, at least one of the first beam or the second beam having one or more gauges for sensing a force applied to the apparatus; and
   a stud fitted within the sense element between the first beam and the second beam, the stud having a first end and a second end, the first end of the stud free floating with respect to the sense element, the second end of the stud being attached to the second end of the sense element.

2. The apparatus of claim 1, wherein the second end of the stud is secured to the second end of the sense element using a spot weld.

3. The apparatus of claim 1, wherein the second end of the stud second end of the stud is secured to the sense element using a fastener.

4. The apparatus of claim 3, wherein the fastener is a nut.

5. The apparatus of claim 1, wherein the stud includes a ridge for providing overload protection for the apparatus, the ridge causing the stud to make contact with the sense element after a force of a predetermined magnitude is applied to the first end of the stud.

6. The apparatus of claim 1, wherein the one or more gauges are for sensing a strain on the sense element.

7. The apparatus of claim 1, wherein the one or more gauges are glass-bonded gauges.

8. The apparatus of claim 1, wherein the one or more gauges include a piezoresistive layer.

9. The apparatus of claim 8, wherein the piezoresistive layer is an epitaxial piezoresistive layer.

10. The apparatus of claim 1, wherein the one or more gauges include aluminum.

11. The apparatus of claim 1, wherein the one or more gauges are arranged to form a Wheatstone bridge circuit.

12. The apparatus of claim 1, wherein the one or more gauges include one or more resistive elements that are part of a bridge circuit.

13. The apparatus of claim 12, wherein the bridge circuit is a full-bridge circuit.

14. The apparatus of claim 1, wherein one or more of the gauges are mono crystalline silicon gauges.

15. An occupant weight sensor (OWS) comprising:
a sense element having a first end, a second end, a first beam, and a second beam, the first beam and the second beam being between the first end and the second end of the sense element, at least one of the first beam or the second beam having one or more gauges for sensing a strain to at least one of the first beam or the second beam, the strain being caused by a force applied to the OWS; and
a stud fitted within the sense element between the first beam and the second beam, the stud having a first end and a second end, the first end of the stud free floating with respect to the sense element, the second end of the stud being attached to the second end of the sense element.

16. The OWS of claim 15, wherein the sensed force takes a path from the first end of the stud through the stud to the second end of the stud, from the second end of the stud to the second end of the sense element, and from the second end of the sense element to the first end of the sense element via the second beam.

17. The OWS of claim 15, further comprising:
a ridge for providing overload protection for the OWS, the ridge causing the stud to make contact with the sense element after a force of a predetermined magnitude is applied to the first end of the stud.

* * * * *